May 3, 1966 R. B. BENDER 3,248,884

PIPELINE DITCH BREAKER

Filed July 15, 1963

RICHARD B. BENDER
INVENTOR.

BY Herbert J. Brown

ATTORNEY 3,248,884
PIPELINE DITCH BREAKER
Richard B. Bender, P.O. Box 11302, Fort Worth, Tex.
Filed July 15, 1963, Ser. No. 295,092
2 Claims. (Cl. 61—35)

This invention relates to pipeline ditch breakers and has reference to a lightweight yet effective device to take the place of sand bag dams in ditches on slopes and uneven terrain.

An object of the invention is to provide a pipeline ditch breaker which may be quickly and conveniently installed, and one including a flexible expander so that the sides of the breaker are firmly set against the ditch walls.

Another object is to provide a pipeline ditch breaker which is automatically forced against the bottom and walls of the ditch as the ditch is backfilled.

A particular object is to provide a pipeline ditch breaker wherein the pipe in the ditch serves as an anchor.

These and other objects will become apparent from the following description and accompanying drawing, wherein.

Figure 1:
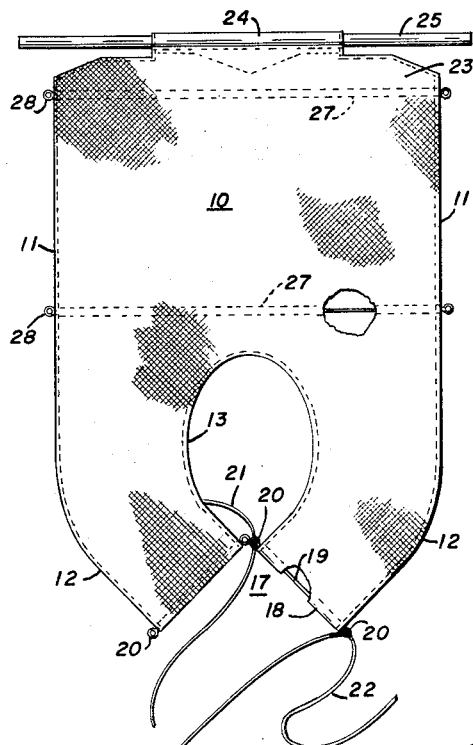
FIGURE 1 is a front elevational view of a pipeline ditch breaker in accordance with the present invention.
Figure 2:
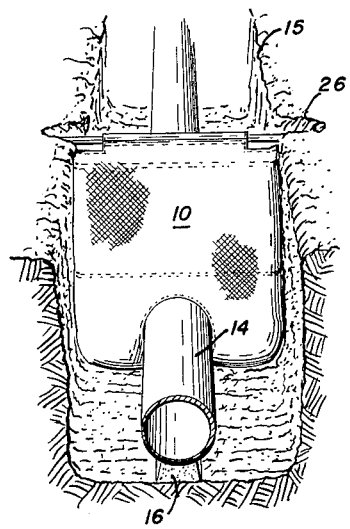
FIGURE 2 is a perspective view of the breaker illustrated in FIGURE 1 and shown installed in a ditch and secured to a pipe.
Figure 3:
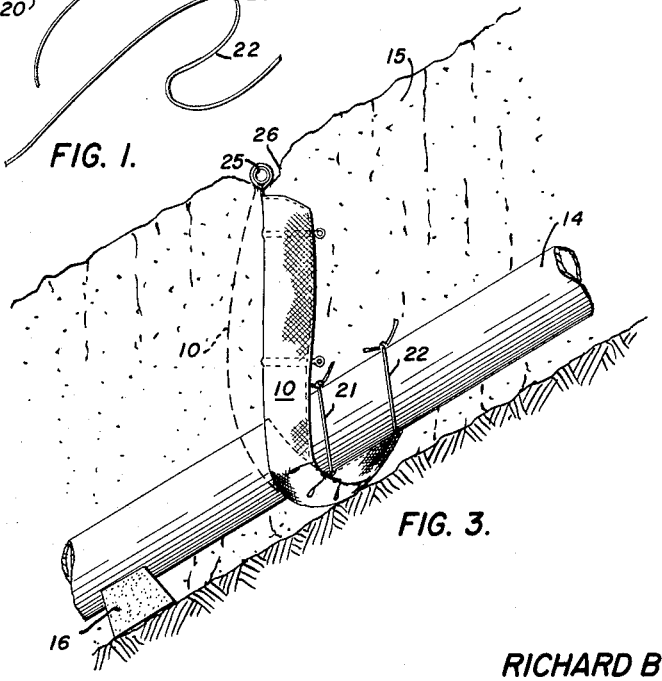
FIGURE 3 is a side view of FIGURE 2 and showing the position of breaker, by dotted lines, when the ditch is backfilled.

The illustrated form of the invention includes a sheet 10 of flexible material having parallel sides 11 and a generally round lower end 12. Spaced from the edges of the round end 12 there is a vertically disposed elliptical opening 13 for receiving the diameter of the pipe 14 when the latter is laid in the ditch 15. The width of the material is greater than the width of the ditch 15. As shown in FIGURES 2 and 3 the pipe 14 rests on spaced supports 16 in the bottom of the ditch 15 or on the bottom of the ditch in accordance with conventional practice. The lower center of the round end 12 includes a notch 17, the upper corner of which extends into the opening 13, and the edges of the notch are hemmed, at 18, where they receive wire stiffeners 19. The wire stiffeners 19 extend outwardly of the edges of the material 10 where they are formed with eyes 20 for receiving cords 21 and 22.

The top center portion 23 of the material 10 is hemmed, at 24, to receive a supporting rod 25 which is longer than the ditch 15 is wide. As shown in FIGURE 2, opposite sides of the ditch 15 may be notched, as at 26, to receive the extending ends of the rod 25. Parallel with the supporting rod 25 and above the pipe receiving opening 13 there are transverse spring expander wires 27 sewed in the material 10 and extending just beyond the vertical edges 11 for engaging the walls of the ditch 15. The extending ends of expander wires are looped to form eyes 28 to prevent displacement of the wires prior to installation.

The sheet material 10, which is hemmed around all edges, may be of any suitable substance, but it should be sufficiently permeable to allow water seepage. A fairly open mesh nylon cloth has been found suitable for this purpose, but burlap may also be used even though it is subject to rotting after the backfill has become set in the ditch.

To install the breaker the extending ends of the supporting rod 25 are placed in the notches 26 at the upper sides of the ditch 15 and the eyes 28 of the expander wires 27 are placed against walls of the ditch. The expander wires 27 are bowed toward the downhill length of the ditch 15 and the adjacent eyes 20 of the stiffener wires 19 are laced together beneath the pipe 14 by the cords 21 and 22, which cords are then tied around the pipe on the up hill side of the breaker. Dirt, including rocks, if any, is backfilled in the ditch 15 on both sides of the material. Subsequent weather causes packing of the dirt, but the latter is prevented from washing out of the ditch by reason of the dam effect of the described breaker.

The invention is not limited to the exemplary construction herein shown and described, but may be made in various ways within the scope of the appended claims.

What is claimed is:

1. A pipeline ditch breaker comprised of a sheet of flexible porous material having a straight upper edge, the width of said material being greater than the width of the ditch in which said material is to be installed, a rod longer than the width of said material attached to the center portion of the latter, a generally round opening in said material of a size to receive the diameter of the pipe laid in said ditch, said opening being spaced from the bottom center portion of said material, a notched opening in the bottom of said material extending into said generally round opening, transverse spring expander wires secured to and extending across said material at said top edge and above said generally round opening, and cords connected with the corners of said material defined by notched opening, said cords being of a length to be tied around said pipe.

2. A pipeline ditch breaker as defined in claim 1, and including wire stiffeners in the edges of said material defined by said notched opening.

References Cited by the Examiner
UNITED STATES PATENTS 1,052,338  2/1913  Holmes _____ 61—29
1,380,439  6/1921  Thompson _____ 61—29

CHARLES E. O'CONNELL, Primary Examiner.
JACOB SHAPIRO, Examiner.